United States Patent [19]

Medney

[11] 4,037,861
[45] July 26, 1977

[54] EXPANSION JOINT

[76] Inventor: Jonas Medney, 3504 Woodward St., Oceanside, N.Y. 11572

[21] Appl. No.: 662,595

[22] Filed: Mar. 1, 1976

[51] Int. Cl.² .................. F16L 27/00; F16L 43/00
[52] U.S. Cl. .................................... 285/168; 285/181
[58] Field of Search ............ 285/181, 184, 168, 276, 285/305

[56] References Cited

U.S. PATENT DOCUMENTS

| 1,393,987 | 10/1921 | Wampler | 285/168 |
| 3,606,402 | 9/1971 | Medney | 285/305 |
| 3,858,601 | 1/1975 | Ensinger | 285/168 |
| 3,900,221 | 8/1975 | Fouts | 285/168 |

Primary Examiner—Patrick D. Lawson
Attorney, Agent, or Firm—Bauer, Amer & King

[57] ABSTRACT

This invention relates generally to pipe systems and, more particularly, to an improved sliding expansion joint for coupling two adjacent lengths of pipe.

1 Claim, 5 Drawing Figures

4,037,861

EXPANSION JOINT

BACKGROUND OF THE INVENTION

In many applications, under specific conditions, means must be provided to permit thermal expansion and terminal motion of adjacent pipe sections. In certain instances, excessive reaction loading on the terminal equipment or upon the valves and other internal components introduces excessive stress on the piping system. In other cases, excessive pressure may also cause expansion of the pipes in a radial direction. Many times, because it is necessary to use the most direct routing for the pipes, there is insufficient flexibility in the pipe system. In situations such as these, expansion joints are frequently used.

Generally speaking, there are two basic types of expansion joints. The first is the sliding joint in which there is relative motion of adjacent parts and the second is the flexible joint in which there is no such relative motion but rather a distributed distortion of the device itself. Flexible joints are typically those depending on the elasticity of the material, bellows, or corrugated pipe. The present invention is of the sliding type of expansion joint in that it involves a particular configuration wherein various parts of the expansion joint configuration involves relative motion of adjacent parts and uses swivel joints and/or ball type joints.

It is well known that, due to heat and/or pressure, pipes tend to grow in length if both ends of the pipe are fixed. Under such conditions the pipe will buckle. If an expansion joint is used without an end load, then the pipe will see only a positive hoop stress and under pressure will create a negative longitudinal stress. A situation such as this may cause a buckling failure. An expansion joint that is capable of maintaining a full positive end load on the pipe at all times keeps the pipe line stable.

SUMMARY OF THE INVENTION

The present invention is particularly directed to an expansion joint having a plurality of sections formed into a particular configuration to permit expansion between adjacent lengths of pipe in a pipe system. A first section is coupled to one of the adjacent lengths of pipe at right angles thereto. A second section is coupled at right angles to the first section such that it can rotate around the longitudinal axis of the first pipe section. A third pipe section is coupled to the opposite length of pipe from the pipe system forming a right angle thereto. A fourth pipe section is coupled at right angles to the third pipe section in a manner that permits its rotation around the longitudinal axis of the third pipe section. A fifth pipe section intercouples the second and fourth pipe sections at right angles to each at such a manner that the second and fourth pipe sections can rotate around the longitudinal axis of the fifth pipe section. The various pipe sections are interconnected with joints which permit the aforementioned rotations. Swivel type joints which permit relative angular rotation between the two pipe sections interconnected thereby, or ball joints permitting relative axial rotation of the two pipe sections interconnected thereby could be used for the joints of the configuration.

Accordingly, it is an object of the present invention to provide an improved piping system that will accommodate axial expansion of various sections thereof.

Another object of the present invention is to provide an improved expansion joint for a pipe system that is subjected to thermal load.

Still another object of the present invention is to provide an improved expansion joint for a pipe system wherein rigid tubular sections are used and wherein relative axial movement between the sections is permitted.

Yet a further object of the invention is to provide an improved expansion joint of a particular configuration and utilizing swivel joints and/or ball joints to permit expansion and contraction of the configuration.

yet another object of the invention is to provide an improved expansion joint for a pipe system comprising a unique pipe configuration interconnecting adjacent lengths of pipe and permitting control of the expansion by adjusting the lengths of the pipe configuration.

Yet a further object of the invention is to provide an improved expansion joint for a pipe system which permits adjacent lengths of pipe of remain in axial relationship.

A primary object of this invention is to provide an expansion joint that keeps the piping system under longitudinal tension rather than exposing the line to induced negative longitudinal stress and possible buckling.

Yet another object of the invention is to provide an improved expansion joint for a pipe system including an intermittent section between adjacent lengths of pipe having an S-type configuration whose upper and lower section can move in hinged fashion relative to the middle section.

These and other objects, features and advantages of the invention will, in part, be pointed out with particularity and will, in part, become obvious from the following more detailed description of the invention taken in conjunction with the accompanying drawing, which forms an integral part thereof.

BRIEF DESCRIPTION OF THE DRAWING

In the various figures of the drawing, like reference characters designate like parts.

In the drawing

DESCRIPTION OF THE PREFERRED EMBODIMENT

Figure 1:
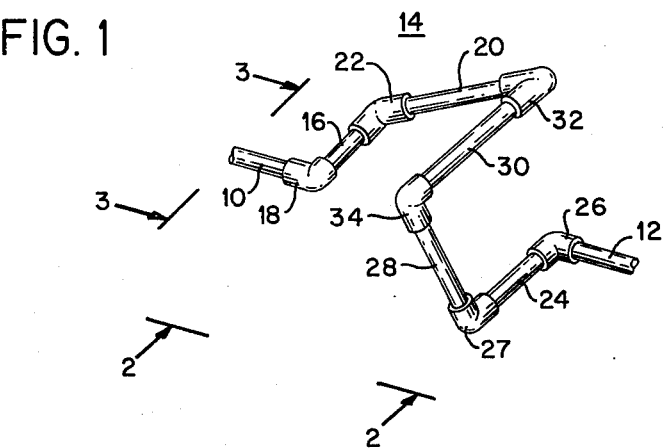
FIG. 1 is a schematic view illustrating the expansion joint configuration in accordance with the present invention.
Figure 2:
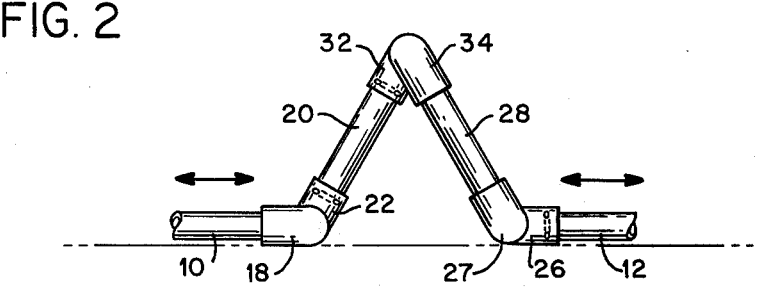
FIG. 2 is a side view of the configuration of FIG. 1 taken along line 2—2 of FIG. 1.
Figure 3:
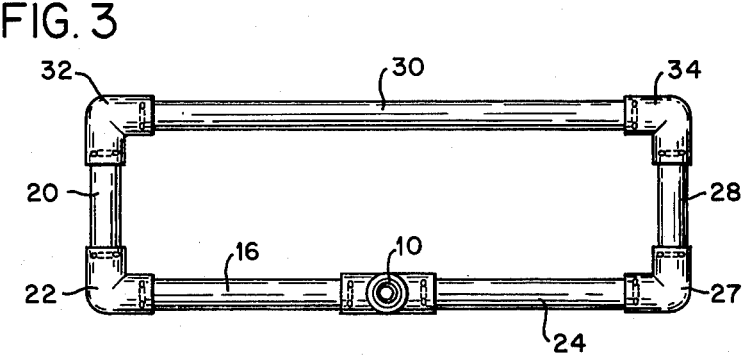
FIG. 3 is an end view of the pipe configuration of FIG. 1 taken along line 3—3 of FIG. 1.

Referring now to FIGS. 1, 2 and 3, there is shown various sections fragmentarily of the pipe system and expansion joint configuration comprising the present invention. For purposes of this discussion, reference will be made only to two adjacent pipe sections. It should be clearly understood, however, that the expansion joint configuration comprising the present invention may be applied between any two consecutive pipe sections of a pipe line whether in line or parallel to each other.

There is shown two adjacent pipe sections 10 and 12 that are coupled to each other by an expansion joint generally designated by the reference character 14. The configuration includes a first pipe section 16 joined to the pipe 10 by means of joint 18. A right angle exists between the sections 10 and 16. A second pipe section 20 is joined at a right angle to section 16 by means of joint 22. A third pipe section 24 is joined at a right angle to section 12 by means of joint 26. A fourth pipe section 28 is joined to pipe section 24 at right angles thereto by means of joint 26. Pipe section 30 interconnects pipe sections 20 at a right angle thereto by means of joint 32 and to pipe section 28 at right angles thereto by means of joint 34.

Pipe sections 16, 20 and 30 lay in a single plane. Similarly, pipe sections 24, 28 and 30 lay in a second plane intersecting the first plane. The joints are so arranged that the two planes formed by the two halves of the configuration and intersecting with pipe section 30 can be moved relative to each other. This is shown by the arrows in FIG. 2. When the two adjacent lengths of pipe 10, 12 and extended in an outward direction away from each other, the angle between the two plane sections will increase as the sections 20 and 28 move away from each other with section 30 moving in a downward direction. Conversely, when sections 10 and 12 expand thereby moving towards each other, the angle α between the two plane sections decreases as sections 28 and 20 move towards each other with pipe section 30 moving upward until at its extreme position the angle between the two plane sections approaches zero. If the line sections 10 and 12 are not in line the angle α can become negative.

It is, therefore, seen that in one extreme position, where most planes lay adjacent to each other and sections 20 and 28 lay in a same plane, the distance between the pipes 10 and 12 will be equal to the total lengths of pipe sections 20 and 28 plus the additional length provided by the pipe joints therebetween. On the other hand, in its opposite extreme position, the ends of pipe sections 10 and 12 will be almost touching each other with the pipe sections 20 and 28 lined up parallel to each other. Thus, the total amount of expansion permitted with the expansion joint configuration of this invention is equal to the combined lengths of sections 20 and 28 plus the additional lengths provided by the joints therebetween. If the incoming line and the outgoing line are not aligned, the angle α can become negative thereby increasing the total amount of expansion.

In order to provide the rotation within the expansion joint configuration shown in the drawing, swivel type joints and/or ball type joints must be used at various locations. Thus, it is necessary to have pipe sections 20 rotate around the longitudinal axis of pipe section 16. This can be provided by using a fixed joint 18 and a swivel type joint 22 which is fixedly connected to section 16 and permits section 20 to rotate thereabout. Similarly, joint 26 could be fixed and joint 27 could be of the swivel type permitting section 28 to rotate about the longitudinal axis of section 24. Alternatively, joints 22 and 27 could be fixed joints and joints 18 and 26 could be ball type joints. In this manner the entire pipe section 16 and 24 would rotate axially within respective ball joints 18 and 26. However, since pipe sections 20 and 28 are fixedly connected to their respective joints 22, 26, as pipe sections 16 and 24 axially rotate, pipe sections 20 and 28 will rotate about the longitudinal axis of sections 16 and 24, respectively.

Sections 20 and 28 must also have relative rotation with respect to pipe section 30. This can be provided by having one of the joints 32, 34 a swivel type joint with the other joint being fixed. In this way, either section 20 or 28, depending upon which joint is the swivel joint, can swivel about the longitudinal axis of section 30 with the other section fixed to section 30. Alternatively, both sections 32 and 34 could be swivel type joints. Still further, one or both of the joints 32 and 34 could be ball type joints permitting the section 30 to axially rotate within the joint 32 or 34 or both.

It is, therefore, seen that numerous type of joints could be used to obtain the required relative rotation of the various sections with respect to each other. The objective to be reached, however, is that the plane formed by section 16, 20 and 30 can be moved relative to the plane formed by sections 24, 28 and 30 with the longitudinal axis of section 30 being the intersection between the two planes.

The configuration as shown in the figures indicates that the two adjacent lengths of pipe 10, 12 lay in a same plane and, in fact, are in a common or adjacent axis. This can be achieved by making the length of section 16 equal to the length of section 24 and making the length of section 30 equal to the combination of the length of sections 16 and 24. However, it is understood that sections 10 and 12 need not lay along the same axis, nor, in fact, need they lay in the same plane. Thus, the lengths of the various sections can be adjusted and varied to interconnect two adjacent lengths of pipe regardless of the axial relationship between them and regardless of the different planes that they may be in. Furthermore, while the configuration as shown have the section 16 in opposite direction to section 24, it is understood that this need not be the case. Section 30 could, in fact, be located in opposite direction to that shown in the drawing wherein it would be 180° opposed to that shown in the figures. Similarly, sections 16 and 24 could also be 180° out of that position shown in the figures.

In addition, the lengths of pipe in the expansion joint configuration shown could be varied such that section 24 be longer or shorter than section 16; section 28 could be longer or shorter than section 20, etc. In this manner, the expansion joint configuration can be modified to particular requirements of the input and output pipes.

Although in the configuration shown the expansion joint comprised three pipe sections 16, 20 and 30, as well as 24, 28 and 30 for each of the planes, it is understood that there need not be three such pipes forming each plane section but more or less could be used. The only requirement in accordance with this invention is that two planes be formed which intersect along a single line of intersection and the planes are mutually rotatable about this line of intersection. In addition, the planes should be relatively rotatable with respect to the input and output pipe to which the expansion joints are connected.

Figure 4:
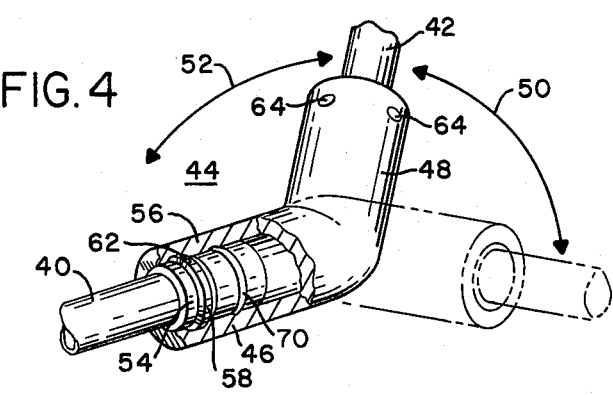
FIG. 4 is a fragmentary perspective view of one embodiment of a swivel joint with sections broken away.
Figure 5:
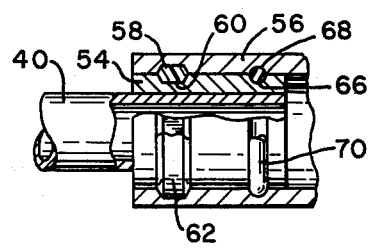
FIG. 5 is a fragmentary partially sectioned elevational view of the interconnection between a pipe section and a joint.

As heretofore described, the joints that can be used to connect adjacent pipe sections could be fixed joints, swivel joints, or ball type joints, depending upon the particular configuration and method of rotation used. Although numerous types of swivel joints and ball type joints are available in the art, by way of example, FIGS. 4 and 5 show one swivel joint with locking means for adjacent pipe sections, the locking means being as described by U.S. Pat. No. 3,606,402, granted on Sept. 20, 1971, to Jonas Medney. Referring now to FIGS. 4 and 5, wherein like reference numerals identify like parts, there is shown adjacent pipes 40 and 42 which are interconnected by means of the swivel joints shown generally at 44. The swivel joint as shown is fixedly connected to the pipe 40 by means of joint section 46 while joint section 48, which is fixedly secured to pipe section 42, can rotate relative to pipe section 40 in a clockwise direction as shown by line 40–50 and in a counterclockwise direction as shown by line 52.

A sleeve 54 is tightly positioned onto the end of the pipe section 40 forming the male ends of the junction, the end of the joint 56 forming the female part of the junction. The male and female sections are respectively provided with confronting circumferential grooves 58 and 60 in order to receive a key member 62. Slots 64, spaced circumferentially around the perimeter of the joint, are at the same axial position as the confronting grooves 56 and 58 as to permit tangential insertion of the key member 62. It will be seen in FIG. 5 that a typical key member 62 defines a hexagonal polygon in cross section.

In addition to the key section 62, the male section includes angular groove 66, arranged to receive an O-ring 70 in order to provide a position fluid tight seal.

In operating the device shown in FIGS. 4 and 5, the female joint is placed over the male joint with the O-ring in place, thereby providing a fluid tight seal. The hexagonal key is then inserted through the groove 64 into the confronting grooves 58 and 60 to retain the joint in a tight fixed connection onto the end of the pipe. However, as is well known in the art, the elbow section of the swivel joint permits relative motion of the two halves of the joint such that the two pipe sections 40 and 42 can swivel relative to each other.

There has been disclosed heretofore the best embodiment of the invention presently contemplated. However, it is to be understood that various changes and modifications may be made thereto without departing from the spirit of the invention.

What is claimed is:

1. An expansion assembly for coupling first and second lengths of pipe, said expansion joint comprising:
   a. a rotatable right angle joint coupling a first pipe section at right angles to said first length of pipe;
   b. a second pipe section coupled at right angles by a rotatable right angle joint to said first pipe section and rotatable about the longitudinal axis of the first pipe section;
   c. a rotatable right angle joint coupling a third pipe section at right angles to the second length of pipe;
   d. a rotatable right angle joint coupling a fourth pipe section at right angles to said third pipe section and rotatable around the longitudinal axis of said third pipe section; and
   e. a fifth pipe section intercoupling said second pipe section and said fourth pipe section by a rotatable right angle joint at each end of the fifth pipe section, such that the second and fourth pipe sections are rotatable around the longitudinal axis of the fifth pipe section; and wherein said joints includes a circumferential groove on the internal surface therein and grooves spaced circumferentially on the outer surface thereof positioned adjacent said internal groove, and wherein the pipe section being joined to said joint includes a cooresponding groove on the outer surface thereof confronting the internal groove of the joint, and further including a key member insertable through the outer groove of the joint into the channel formed by the confronting grooves of the joint and pipe section.

* * * * *